Figure 6:
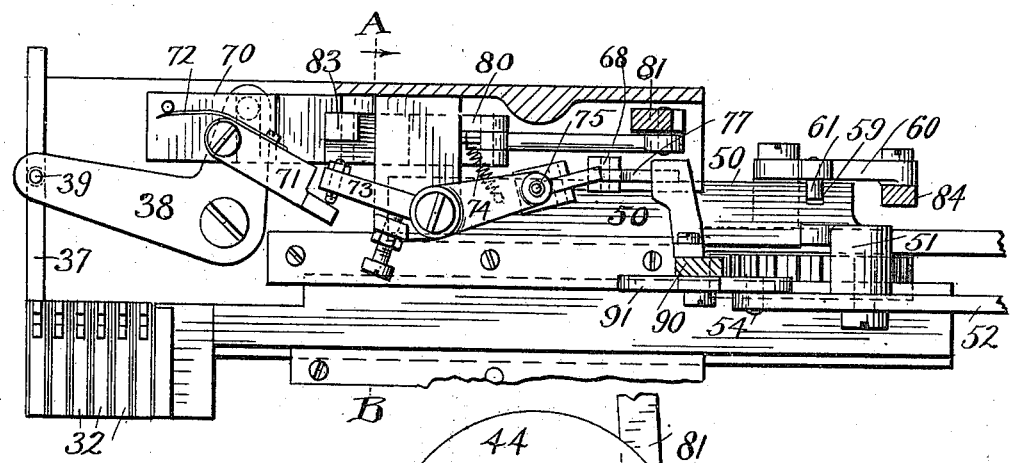

B. F. BELLOWS & C. LUTTROPP.
JUSTIFYING MECHANISM.
APPLICATION FILED MAR. 11, 1907.
974,740.
Patented Nov. 1, 1910.
5 SHEETS—SHEET 1.
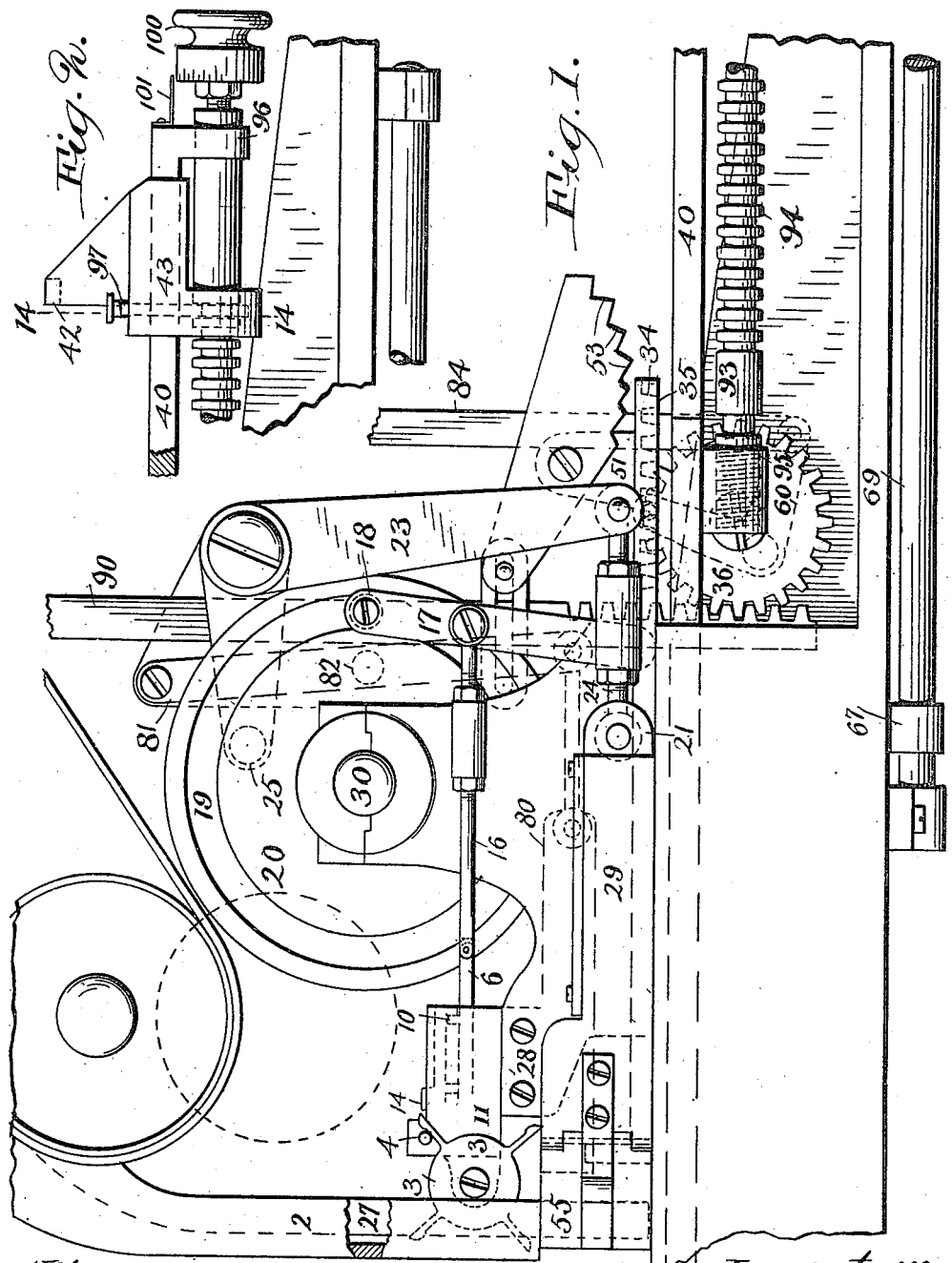
Witnesses
E. B. Gilchrist
H. R. Sullivan
Inventors:
Benjamin F. Bellows
Conrad Luttropp
Thurston Woodward
attys

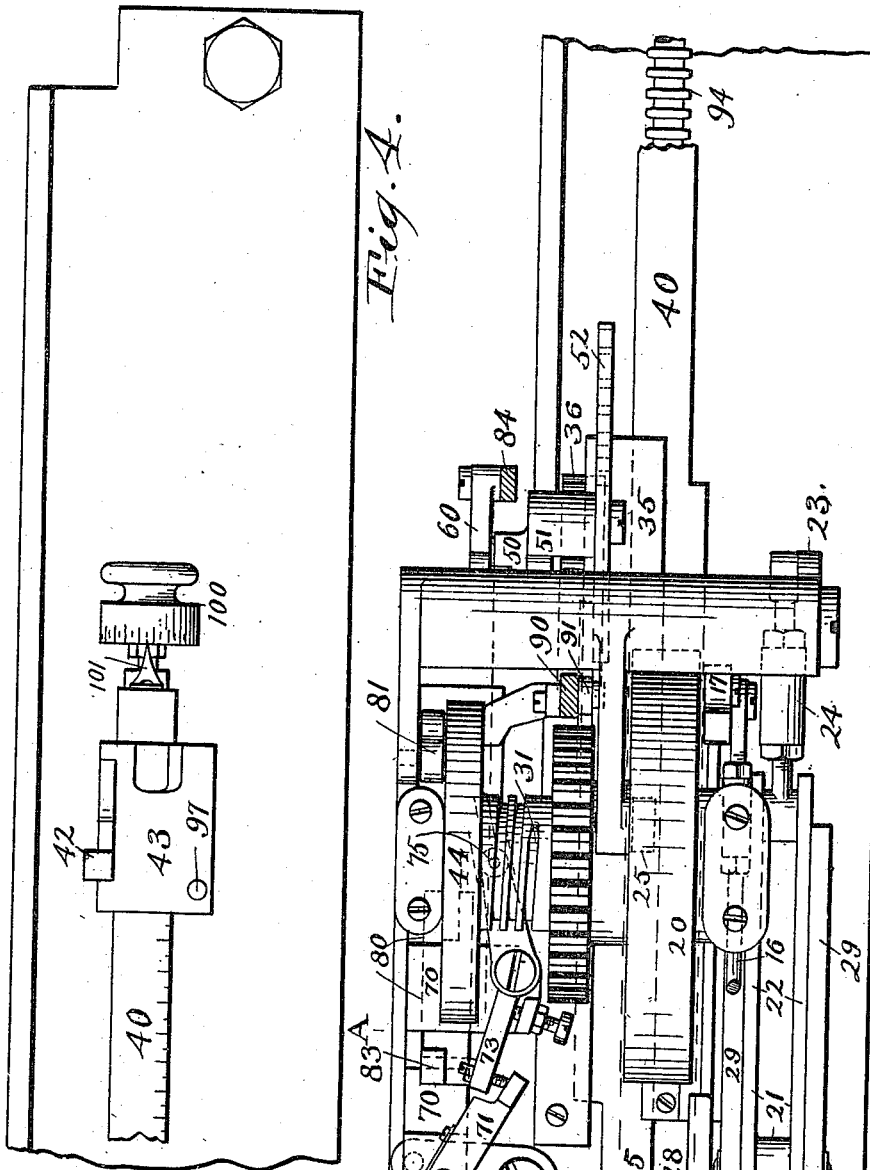

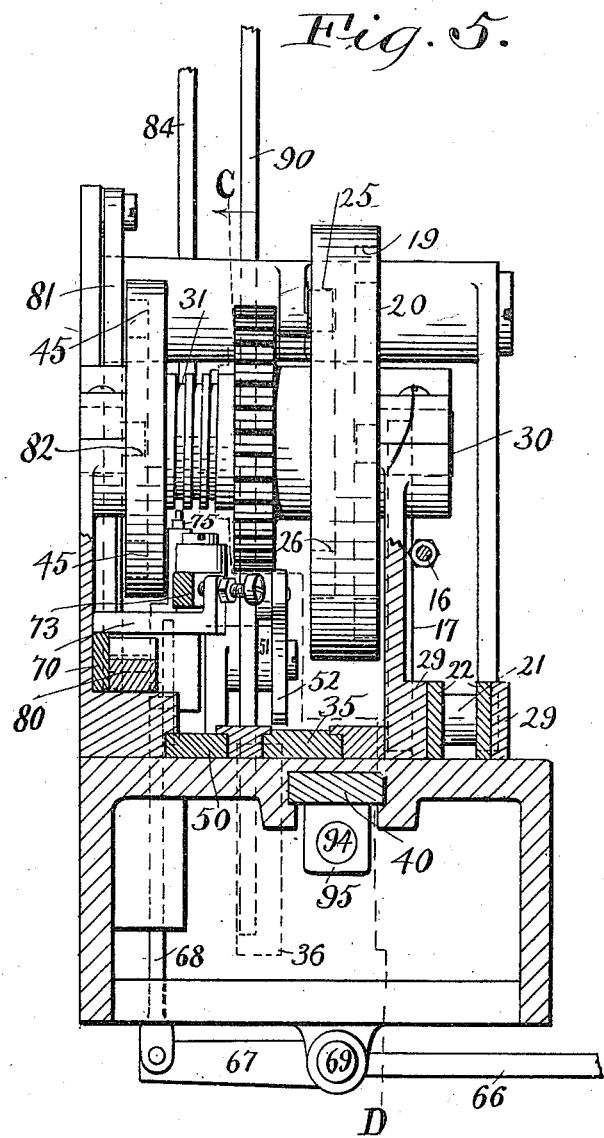

B. F. BELLOWS & C. LUTTROPP.
JUSTIFYING MECHANISM.
APPLICATION FILED MAR. 11, 1907.

974,740.

Patented Nov. 1, 1910.
5 SHEETS—SHEET 4.

Witnesses.
E. B. Gilchrist.
H. B. Sullivan.

Inventors,
Benjamin F. Bellows
Conrad Luttropp
By Thurston Woodward
attys

B. F. BELLOWS & C. LUTTROPP.
JUSTIFYING MECHANISM.
APPLICATION FILED MAR. 11, 1907.
974,740.
Patented Nov. 1, 1910.
5 SHEETS—SHEET 5.
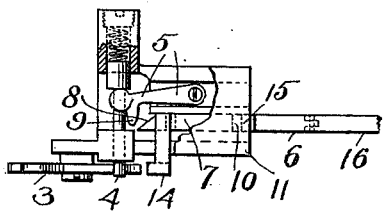
Fig. 8.
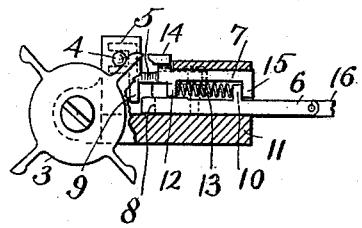
Fig. 10. Fig. 9.
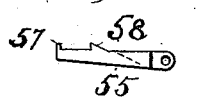
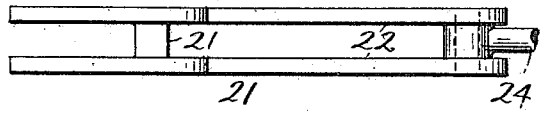
Fig. 12.
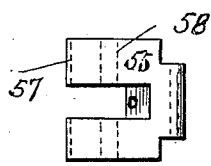
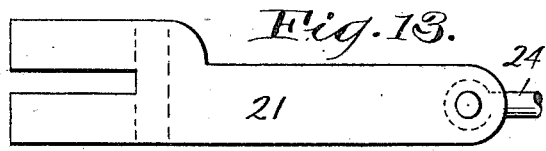
Fig. 11.
Fig. 13.
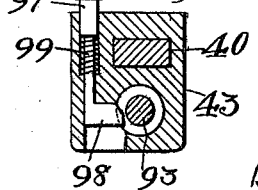
Fig. 14.
Witnesses
E. B. Filchind
H. P. Sullivan
Inventors
Benjamin F. Bellows
Conrad Luttropp
By Thurston Woodward
attys

UNITED STATES PATENT OFFICE.

BENJAMIN F. BELLOWS, OF CLEVELAND, OHIO, AND CONRAD LUTTROPP, OF WOONSOCKET, RHODE ISLAND, ASSIGNORS TO ELECTRIC COMPOSITOR COMPANY, OF NEW YORK, N. Y., A CORPORATION OF NEW JERSEY.

JUSTIFYING MECHANISM.

974,740.   Specification of Letters Patent.   Patented Nov. 1, 1910.

Application filed March 11, 1907. Serial No. 361,661.

*To all whom it may concern:*

Be it known that we, BENJAMIN F. BELLOWS, a citizen of the United States, and residing at Cleveland, in the county of Cuyahoga and State of Ohio, and CONRAD LUTTROPP, a citizen of the United States, residing at Woonsocket, in the county of Providence and State of Rhode Island, have invented a certain new and useful Improvement in Justifying Mechanism, of which the following is a full, clear, and exact description.

This invention is an improvement upon the type of justifying mechanism which forms the subject matter of the Bellows Patent No. 921,063, dated May 11, 1909. In that mechanism, the position of the spacer selecting and releasing member is dependent upon the position of two vertically movable rods. Mechanism is also shown and described by means of which these rods are so moved, as a line is being assembled, that, at any time after the line has reached justifiable length, the said spacer selecting and releasing member will be in proper position to release the proper number of spacers of the proper size to justify said line. The present invention is an improvement upon the mechanism for so moving said rods. The proper movement of the rods is dependent upon and occasioned by the movement of various parts whose primary function is to perform some other necessary part of the work incident to assembling the line.

The present invention, therefore, involves the mechanism for delivering both the matrices and temporary spacers onto the assembling rail, the mechanism for packing them together thereon to form a line and for moving the line along said rail as the line grows in length, and also to coöperating mechanism through which the delivery of temporary spacers onto the assembling rail and the movement of the line along the rail are caused to properly move said rods, which may properly be called controlling devices, that is to say devices for controlling the position of the spacer selecting and releasing member. These controlling devices may be of any suitable specific form adapted for the purpose; and the present invention is, of course, independent of the precise form of the spacer selecting and releasing member or of the precise means by which said controlling devices determine the position of the same.

This invention in the precise form shown is intended to be used as a substitute for the corresponding mechanism shown in said Bellows application.

The object of the invention is to provide mechanism of the character and for the purpose specified which is less complicated than that which is shown in said prior application and which may be operated more rapidly and with less liability to getting out of order.

Figure 7:
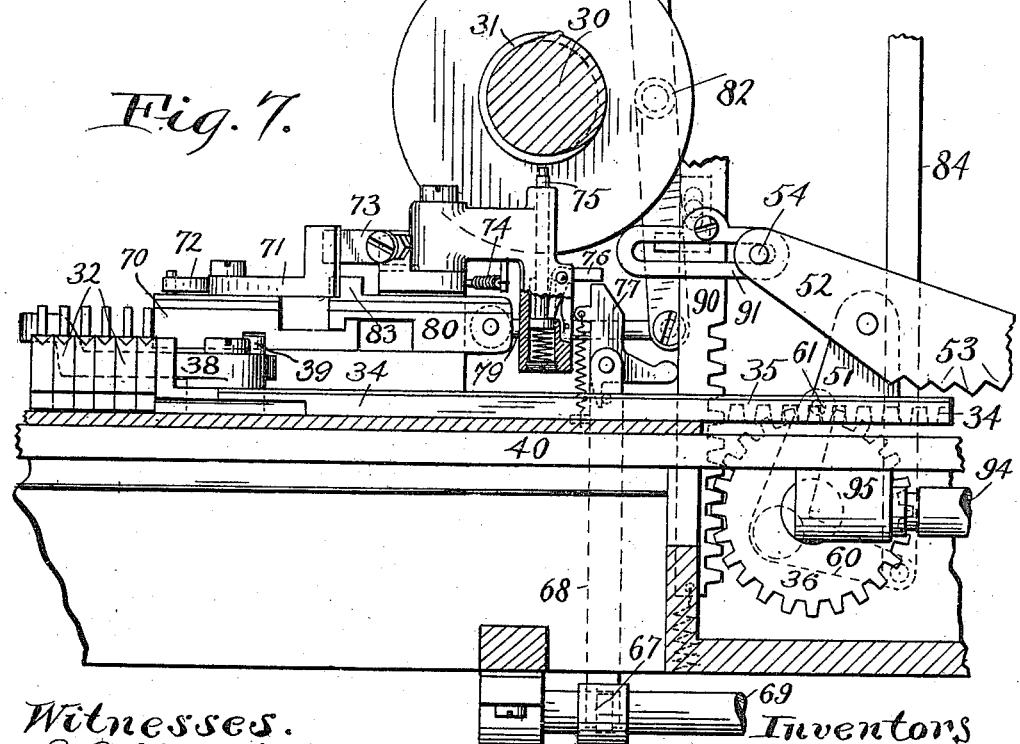

In the drawing, Figure 1 is a front elevation of the mechanism constituting the present invention, or rather of all of the invention except such as is shown in Fig. 2. Fig. 2 is a front elevation of the mechanism which lies at the right of the mechanism shown in Fig. 1. Fig. 3 is a plan view of all of the mechanism shown in Fig. 1, excepting the assembling spout, the star wheel which projects into the same, the mechanism which controls the operation of that star wheel, and the support for that mechanism. Fig. 4 is a plan view of the mechanism shown in Fig. 2. Fig. 5 is a sectional side elevation in the plane of line A—B on Fig. 3. Fig. 6 is a plan view of the mechanism when some of its parts shown in Fig. 3 have been removed. Fig. 7 is a sectional front elevation in the plane indicated by line C—D on Fig. 5. Fig. 8 is a plan view partly sectioned and partly broken away of the mechanism which controls the action of the star wheel 3; Fig. 9 is a front elevation of such mechanism partly in section. Fig. 10 is a plan view of one of the arms 45. Fig. 11 is a front elevation of one of said arms. Fig. 12 is a plan view of the packer; and Fig. 13 is a front view thereof; and Fig. 14 is a vertical sectional view in the plane of line 14 on Fig. 2.

The controlling devices whose proper movement the present invention is designed to bring about are two vertically movable rods 84 and 90. These rods have the same function as do the two rods which are indicated by the same reference characters in said prior application,—that is to say the position of the rod 90 determines the position of the spacer selecting and releasing member in respect to movement thereof crosswise of the machine, *i. e.* to the right or left, and the position of the rod 84 determines the position of this selecting and releasing member in respect to movements at right angles to its other movement above referred to.

All of the parts which are included in the present invention receive their motion, directly or indirectly, from a constantly driven shaft 30; and therefore the movements of all of said parts may be properly synchronized. The present invention is inclusive of all of the mechanism driven by said shaft which is concerned in the assembling of lines of matrices and temporary spacers, and in the proper positioning of the controlling devices 84 and 90 to correspond, so to say, with the peculiarities and individual characteristics of each line, whereby, as a result, the spacer selecting and releasing member will assume the required position for releasing the proper number of permanent spacers of the required thickness to justify each line when substituted therein for the temporary spacers which it contains.

2 indicates the assembling spout through which matrices are delivered onto the assembling rail 1. A star wheel 3 is mounted adjacent to this assembling spout. When the star wheel is held against rotation, one arm thereof always projects into the assembling spout beneath the lowest matrix therein, and prevents the matrices from falling out of said spout onto the assembling rail. The arms of this star wheel are placed such distances apart that, if the wheel is allowed to turn when two or more matrices are in the spout, the arm following the arm which sustains the matrices will pass under the next lowest matrix and will thereupon sustain it, if further rotation of the star wheel is prevented. Normally, this star wheel is restrained from movement by the engagement, with one of its arms, of a spring actuated plunger 4 mounted in an immovable part of the machine frame. The mechanism for controlling the movements of this star wheel are shown most clearly in Figs. 8 and 9. A lever 5 engages with a shoulder on this plunger in such way that if the lever be properly moved, the plunger will be moved, in opposition to its spring, from its position in front of an arm on the star wheel.

Adjacent to the parts described are two slides 6 and 7 which are located one above the other, and move in horizontal paths crosswise of the machine *i. e.* to the right or left. These slides are mounted in a box 11, which is secured to a fixture 28. The slide 6 is reciprocated constantly, and it carries a beveled surface 8, which, in every forward movement, engages with the toe 9 on lever 5, and thereby rocks said lever so as to withdraw the plunger and hold it back long enough for the star wheel to move one arm thereof past the plunger. When the slide moves backward the plunger is permitted to be moved forward by its spring in front of the next arm of the star wheel which engages with it, whereby the star wheel is stopped. The slide 6 has an upwardly extended finger 10; and the slide 7 has a downwardly extended finger 12; and a compressible coiled spring 13 lies between them. As slide 6 moves forward the spring is compressed, and it in turn, by pressing against the finger 12, tends to move slide 7, and actually does move it so as to cause an arm 14 thereon to engage with the rear side of that arm of the star wheel with which said plunger engages. The arm 14 is therefore being pressed against the arm of the star wheel by means of the compressed spring 13 at the instant when slide 6 withdraws plunger 4. Thereupon slide 7 is shot quickly forward by the expanding of the spring 13, and it imparts to the star wheel a quick impulse to rotate. When slide 6 makes its backward movement its finger 10 engages with a finger 15 on slide 7 and moves said slide 7 backward into its normal position as shown. As a result of this quick movement of the star wheel, that arm thereof which passes between the two matrices, impels the lowest matrix to move downward faster than it would if moved by gravity only.

The slide 6 receives its motion through a link 16 from a pivoted lever 17 having a pin 18 which projects into a cam groove 19, in the front face of a constantly rotating disk 20, secured to shaft 30. When the star wheel turns one-quarter of a revolution the lowest matrix in the pile which said star wheel was supporting in the assembling throat, drops onto the assembling rail and immediately thereafter it and all of the other matrices and spacers which are lined up on said rail are pushed along by a reciprocating packer 21, a distance equal to the thickness of the last matrix or spacer so added.

The packer is a frame-like slide composed of two connected parallel side bars 22, the left ends of which are adapted to engage with a matrix almost immediately it falls upon the assembling rail. This slide reciprocates back and forth through a definite horizontal path to right and left of the machine, and this motion is imparted to it by a bell crank lever 23, whose lower arm is connected by link 24 with said packer. The other arm of said lever is provided with a pin 25 which projects into a cam groove 26 in the rear face of the disk 20.

In order that the matrices after they have fallen on the assembling rail may be held in proper position to be moved along said rail, a vertical guide 27 is fixed in the assembling spout, and projects down therefrom to the assembling rail. The matrices M, which are constructed with a channel in one side, as shown in Fig. 3, drop through said assembling throat onto the assembling rail with said channel in engagement with said guide 27. There are two spring arms 55 pivoted to the fixed guides 29 for the packer slide 21. These arms are drawn toward each other by a spring 56. The arms project to the left a suitable distance beyond the guides 27 and are provided with inwardly projecting fingers 57 which temporarily overlap the matrix on the assembling rail, and they and said guide prevent it from falling over. Each of these arms carry a beveled surface 58 so arranged that when the packer slide moves to the left from its normal position, which is shown in Fig. 3, the left ends of the side bars of said packer, by engaging with said inclined surface, spread these bars apart and permit the matrix to be pushed by said packer along the assembling rail. From the foregoing it is clear that with each revolution of shaft 30 a matrix may be allowed to fall from the assembling spout onto rail 1, and that with each revolution of said shaft there is a movement of the packer which moves the coincidentally released matrix along said rail.

The temporary spacers 32 are arranged in a rank behind the assembling rail, the left end of said rank engaging with a fixed shoulder 33, and the entire rank being pushed toward said shoulder and compacted together by means of a spring actuated spacer packer slide 35. On the under side of this slide, rack teeth 34 are formed, and these engage with the teeth of a pinion 36. The vertically movable rod 90 is also provided with rack teeth which engage with the same pinion; and a spring 89 is secured to some convenient part of slide 35 or rod 90, so as to impel slide 35 to the left and to impel rod 90 to move downward a definite distance, every time a temporary spacer is moved out of the rank onto the assembling rail. Preferably, this spring is a contractile coiled spring secured to a fixed point and to the lower end of the rod 90 as shown by dotted lines in Fig. 7. The left hand temporary spacer is the one which is always moved forward onto the assembling rail. Therefore, whenever this spacer is so moved forward the other spacers in the rank are moved to the left by the spring induced movement of slide 35, and as a result the rod 90 will be moved down a definite distance, which in the construction shown, is equal to the width of such temporary space.

The left hand temporary spacer is moved forward out of the rank and onto the assembling rail by the action of a guided slide 37 which is movable forward and backward by mechanism to be presently described, which is caused to become active by the actuation of a space key 66.

In the machine is a guided detent slide 40 carrying a detent 41 which, when the line is being assembled, projects over the assembling rail to the left of the growing line, so that it is moved along by pressure from the line, substantially as shown in said prior application,—said line being itself moved by the packer 21. Secured to rod 90 is a horizontally grooved or slotted bar 91. A transversely movable slide 50 movable in suitable guides, is provided with an upwardly extended ear 51 and to this ear the stepped eliminator lever 52 is pivoted. The steps 53 thereon, which are to be engaged by a shoulder 42 on the detent slide, are formed on one end of this eliminator lever. The other end is provided with a pin 54 which enters the horizontal slot in the bar 91. The parts are so proportioned that, for each downward movement of bar 90, which accompanies the withdrawal of a temporary spacer from the rank and its insertion into the growing line, the eliminator lever will be moved upon its pivot through an arc sufficient to carry the next step thereon into the plane of said shoulder 42 on the detent slide. The said shoulder 42 is on a block 43 adjustably secured to the detent slide near its right end. Its position in which it is secured on said slide depends upon the length of the line which the machine is to be arranged to justify. The adjustment of block 43 along the detent slide to adapt the mechanism for lines of different length may be accomplished by means of the following mechanism. The block 43 embraces, and is movable along, the slide. Beneath the slide is a rod 93 having a number of properly placed circumferential grooves 94. The left end of this rod is threaded, and screws into a lug 95 on the under side of slide 40. The right end of this rod is rotatably mounted in a downwardly projecting lug 96 on slide 40. The block 43 carries a vertically movable latch bar 97 having on its lower end a horizontal finger 98, which passes beneath rod 93, and is adapted to engage with any one of the circumferential grooves 94 therein. A spring 99 tends to thrust the bar 97 upward and thus preserve this engagement. To adjust block 43, therefore, the bar 97 is pushed down and the block moved along slide 40 to approximately the required position. Bar 97 is then allowed to move upward to bring the finger 98 thereon into one of the circumferential grooves 94. In order to more accurately adjust the position of block 43 the rod 93 may be turned by means of a knob 100 secured thereto. The hub of this knob may be graduated for coöperation with a pointer 101 so that one may accurately bring the block to such position as is required to adapt the mechanism to justify a line of any predetermined length. The top of the slide 40 should also be graduated, as indicated in Fig. 4, to assist the operator in bringing the block to the proper position. When block 43 is properly placed it will come in contact with a step on the eliminator lever when the line shortage is as great as the justifying mechanism is capable of filling up by means of permanent justifying spacers. After this shoulder on the detent slide has come in contact with one of the steps on the eliminator lever, then for every matrix added to the line the detent slide will be moved to the left a distance equal to that addition, and it will push slide 50 along in the same direction an equal distance. A bell crank lever 60 is pivoted to a part of the fixed framework of the machine. Its substantially vertical arm has a pin 61 which projects into a vertical slot in the slide 50, wherefore whenever slide 50 moves, this bell crank lever will be rocked a distance proportionate to that movement. The vertically movable controller rod 84 is pivotally connected at its lower end with the horizontal arm of this bell crank lever, and therefore this bar will be moved upward every time a matrix is added to the line a distance proportionate to the width of the matrix so added. The mechanism for selecting and releasing the justifying spacer may be governed by the two bars 90 and 85, through mechanism which may be substantially the same mechanism as that which is shown in said pending application No. 330,685.

Coming now to a construction of the mechanism by which the slide 37 is moved forward with the result of moving a temporary spacer out of the rank and over the assembling rail, 38 represents a bell crank lever, one arm of which has a pin 39 projecting into a transverse slot in the top of slide 37. The other arm of this lever engages in a transverse slot in the under side of a slide 70. A slide 80 is in constant motion through the action of the following mechanism, to wit, a lever 81 pivoted to a fixed support and having a pin 82 which engages in a cam groove 45 in the rear face of a disk 44 secured to the same shaft 30 as that to which the disk 20 is secured; and the lower end of this lever 81 is connected by means of a link 79 with the slide 80. A spring pawl 71 is pivoted on slide 70 and is under the influence of a spring 72 tending to swing it into the path of a shoulder 83 on slide 80. The spring pawl 71 is prevented from moving into the position described by means of a lever 73 which is also pivoted on slide 70 and is under the influence of a spring 74 tending to hold it in the position shown in which one end engages with said spring pawl and holds it out of action, as before described. The other end of this lever carries a spring-actuated plunger 75 which occupies a vertical position below but out of contact with the screw 31, on the shaft 30. This spring plunger is held normally out of action by means of a spring actuated trigger lever 76 which engages with a shoulder upon said plunger. This trigger lever has one arm which lies just above a lever 77 pivoted to the upper end of a vertically movable rod 68 whose lower end is connected with an arm 67 on the space key rock shaft 69. Every time the space key is operated, this arm 67 is moved up, and the lever on its upper end, by engaging with the arm 77 of the trigger lever 76 withdraws it from its engagement with the spring plunger. This plunger is thereupon moved upward by its spring, and engages with one of the spiral grooves of the screw 31 on the shaft 30. The result is that the lever 73 is turned on its pivot in opposition to its spring until the pawl 71 is allowed to swing in front of the shoulder 83 on slide 80. During the next movement of slide 80 to the left it engages the end of pawl 71, and thereby moves slide 70 also to the left, which results in such a movement of the lever 38 and slide 37, that the left temporary spacer in the rank is moved out of the rank and onto the assembling rail. When the spring plunger has been moved forward by the screw thread to the rear end thereof, the spiral groove decreases slowly in depth, and ends in an inclined elevation, which pushes the spring plunger down. When it is moved down far enough the spring actuated trigger lever 76 flies into engagement with the shoulder on said plunger and holds it against further upward movement. At the same instant spring 74 moves lever 73 back to its initial position, and this withdraws the pawl 71 from its engagement with shoulder 83. After these actions have taken place, the slide 80, in its next movement to the left, engages with slide 70 and moves it back to its normal position. This screw and the mechanism controlled thereby is provided as a timing device which insures the elapse of sufficient time after a space key is touched and before the temporary spacer is moved over the assembling rail, to give all the matrices which have previously been released, time to escape from the assembling spout and to be pushed along the assembling rail by packer slide above described.

In the machine shown six temporary spacers are provided and, while it is desirable that each actuation of the space key shall cause the insertion of one of those temporary spacers into the line, it is likewise desirable that, after they have been introduced into the line, the actuation of the space key shall have no further effect upon the spacer introducing mechanism. It is for this reason that the lever 77 is pivoted to the upper end of the rod 68 as the means for engaging with the trigger lever 76 which withholds the plunger lever 75 from flying upward. The lever 77 has a tail piece, and the rod 90 carries an arm 102 which, when the controller rod 90 has moved down six steps, will have come into engagement with the tail piece of the lever 77 and move said lever out of the range of the trigger lever 76. The subsequent operations of the space key will not, therefore operate the lever 76 and will not, therefore, influence the operation of any of the spacer introducing mechanism.

Having described our invention, we claim:

1. The combination of an assembling spout, a vertical matrix guide therein which projects below the spout, and an assembling rail below said spout and guide, with a reciprocating packer comprising two side bars adapted to pass on opposite sides of said guide and into contact with the matrix engaging therewith, whereby said matrix is moved along said rail.

2. The combination of an assembling spout, a vertical matrix guide thereon, and an assembling rail, with means for dropping the matrices onto said assembling rail in engagement with said guide, two spring-actuated arms lying respectively in front of and behind said guide and having inwardly directed fingers and beveled surfaces, with a reciprocating packer comprising two side bars adapted to pass on opposite sides of said guide and to engage said beveled surfaces, and thereby spread the arms and to then move the matrix beyond said fingers.

3. The combination of an assembling spout, escapement mechanism therefor, escapement operating mechanism, a packer, a rotatable shaft, and means secured to said shaft for operating the packer and the escapement operating mechanism.

4. The combination of an assembling spout, a rotatable star wheel whose arms project into said spout, a device restraining the rotation of said star wheel, a spring-actuated device for causing the same to rotate, and a device for synchronously withdrawing said restraining device and applying tension to said spring.

5. The combination of an assembling spout, a rotatable star wheel whose arms project into said spout, a plunger extending into the path of one of said arms to prevent the rotation of said star wheel, a reciprocating slide, mechanism operated thereby for withdrawing said plunger, a movable device for engagement with an arm of said star wheel, a spring for actuating the said device, said spring lying in the path of a part of said slide, whereby it is put under tension just before said plunger is withdrawn.

6. The combination of an assembling spout, a rotatable star wheel whose arms project into said spout, a device restraining the rotation of said star wheel, a spring-actuated device for causing the same to rotate, a device for synchronously withdrawing said restraining device and applying tension to said spring, a reciprocating packer, a rotating shaft, and mechanism controlled by said shaft for moving said packer and the plunger-withdrawing and spring-tensioning device.

7. The combination with an assembling spout, a rotatable star wheel whose arms project into said spout, a spring-actuated plunger adapted to normally project in front of one of said star wheel arms, a lever for withdrawing the same, a slide for operating said lever, another slide having an arm adapted to engage with the rear side of the restrained star wheel arm, an actuating spring of the last mentioned slide,—said spring being arranged to be put under tension by the plunger-releasing movement of the first mentioned slide.

8. The combination with an assembling spout, a rotatable star wheel whose arms project into said spout, a spring-actuated plunger adapted to normally project in front of one of said star wheel arms, a lever for withdrawing the same, a slide for operating said lever, another slide having an arm adapted to engage with the rear side of the restrained star wheel arm, an actuating spring for the last mentioned slide,—said spring being arranged to be put under tension by the plunger-releasing movement of the first mentioned slide, and means whereby the plunger-releasing slide in its back stroke withdraws the other slide to its normal position.

9. The combination with an assembling spout, a rotatable star wheel whose arms project into said spout, a spring-actuated plunger adapted to normally project in front of one of said star wheel arms, a lever for withdrawing the same, a slide for operating said lever, another slide having an arm adapted to engage with the rear side of the restrained star wheel arm, an actuating spring for the last mentioned slide, said spring being arranged to be put under tension by the plunger-releasing movement of the first mentioned slide, means whereby the plunger-releasing slide in its back stroke withdraws the other slide to its normal position, a rotatable cam, a lever operated thereby, and a link connecting said lever with the plunger withdrawing slide.

10. The combination of an assembling spout, a rotatable star wheel whose arms project into the same, means restraining the rotation of said star wheel, mechanism which will rotate said star wheel when said restraining means are withdrawn, and means for withdrawing said restraining means.

11. The combination with a support for a rank of temporary spacers, a spring-actuated slide tending to move said rank, an abutment against which the rank is forced by said slide, means for moving the temporary spacers, singly, forward of said rank, rack teeth carried by said slide, a pinion engaging with said rack teeth, and a vertically movable controller rod having rack teeth which also engage with said pinion.

12. The combination with the assembling rail, of a rank of temporary spacers behind said rail, an abutment for said rank, a spring actuated slide for forcing the rank toward said abutment, a vertically movable controller rod, and mechanism whereby it is moved by said slide, a slotted bar secured to said controller rod, a horizontally movable slide, a stepped eliminator pivoted thereto carrying a pin which enters the slot in said bar, a second vertically movable controller rod, and mechanism whereby it is actuated by the last mentioned slide, a detent slide having a detent extending over the assembling rail, and having a shoulder adapted to engage with said stepped eliminator.

13. The combination with a vertically movable controller rod, and a slotted bar secured thereto, a slide, a stepped eliminator pivoted thereto and having a pin which enters a slot in said bar, another vertically movable controller rod, and mechanism operated by said slide for moving the last mentioned controller rod.

14. The combination of an assembling spout, an escapement therefor, means for introducing temporary spacers into the line, a rotatable shaft, mechanism operated by said shaft for actuating the escapement mechanism and the spacer introducing mechanism, and timing mechanism controlled by said shaft for delaying the effective action of the spacer introducing mechanism after said action has been initiated.

15. The combination of an assembling spout, an escapement therefor, means for introducing temporary spacers into the line, a rotatable shaft, mechanism operated by said shaft for actuating the escapement mechanism and the spacer introducing mechanism, timing mechanism controlled by said shaft for delaying the effective action of the spacer introducing mechanism, a space key, and mechanism controlled thereby for initiating the action of said timing mechanism.

16. The combination of means for introducing temporary spacers into a line, a train of mechanism for operating said means, which train of mechanism includes a movable member capable of occupying either an operative or an inoperative position, means for moving it into operative position, means for moving to and holding it in the inoperative position, a space key, and mechanism controlled thereby for releasing said member and permitting its movement to operative position.

17. The combination of means for introducing temporary spacers into a line, a train of mechanism for operating said means, which train of mechanism includes a movable member capable of occupying either an operative or an inoperative position, means for moving it into operative position, means for moving it to and holding it in the inoperative position, a space key, mechanism controlled thereby for releasing said member and permitting its movement to operative position, and timing mechanism for delaying the movement of said member to its operative position.

18. The combination of means for introducing temporary spacers into a line, a movable device for operating said means, a constantly reciprocating device for operating the device first mentioned, a movable member carried by one of said devices and adapted to occupy a position to transmit motion from one to the other, means for moving said member to said position, means for moving said member to an inoperative position, a space key, and mechanism controlled thereby for releasing said member and permitting it to move to its operative position.

19. The combination of means for introducing temporary spacers into a line, a movable device for operating said means, a constantly reciprocating device for operating the device first mentioned, a movable member carried by one of said devices and adapted to occupy a position to transmit motion from one to the other, means for moving said member to said position, means for moving said member to an inoperative position, a space key, mechanism controlled thereby for releasing said member and permitting it to move to its operative position, and a timing device for causing said member to move slowly to its operative position.

20. The combination of means for introducing temporary spacers into a line, a movable device for operating said means, a constantly reciprocating device for operating the device first mentioned, a movable member carried by one of said devices and adapted to occupy a position to transmit motion from one to the other means for moving said member to said position, means for moving said member to an inoperative position, a space key, mechanism controlled thereby for releasing said member and permitting it to move to its operative position, a timing device for causing said member to move slowly to its operative position, a shaft, and mechanism controlled thereby for operating the constantly reciprocating member and the timing mechanism.

21. The combination of means for introducing temporary spacers into a line, a movable device for operating said means, a constantly reciprocating device for operating the device first mentioned, a movable member carried by one of said devices and adapted to occupy a position to transmit motion from one to the other, means for moving said member to said position, means for moving said member to an inoperative position, a space key, mechanism controlled thereby for releasing said member and permitting it to move to its operative position, a timing device for causing said member to move slowly to its operative position, a constantly rotating screw, a device carried by said member and adapted to engage with said screw, means normally holding said device out of engagement with the screw, a space key, and means operated thereby for permitting said device to move into contact with said screw.

22. The combination of a slide which is normally idle, a slide which is normally in constant reciprocation, a rotatable shaft, mechanism operated thereby for imparting constant reciprocation to said slide, a screw upon said shaft, a lever pivoted to one of said slides and adapted to occupy either a position for engagement with the other slide or an inactive position as required, another lever pivoted to the same slide having one arm adapted to engage with the first named lever to hold it in an inactive position and having at the other end a movable device for engagement with said screw, means normally withholding said device from such engagement, a space key, and means operated thereby for releasing said device and permitting its movement into engagement with said screw.

23. The combination of means for moving temporary spacers onto the assembling rail, a slide, and intermediate mechanism for operating said spacer introducing device, a spring pawl pivoted to the slide, mechanism for moving said spring pawl to an inactive position and for normally holding it in that position, a constantly reciprocating slide adapted to engage with said spring pawl when the latter is released, a space key, and mechanism rendered active by the space key for operating said pawl withholding mechanism.

24. The combination of means for moving temporary spacers onto the assembling rail, a train of operating mechanism for actuating said means, a pivoted lever for breaking the operative connection between necessary parts of that train of mechanism, a spring plunger carried by said lever, a constantly rotating screw adapted to be engaged by said plunger, a space key, and mechanism operated thereby for releasing said plunger and permitting it to engage with said screw thread.

25. The combination of means for moving temporary spacers onto the assembling rail, a train of operating mechanism for actuating said means, a pivoted lever for breaking the operative connection between necessary parts of that train of mechanism, a spring plunger carried by said lever, a trigger piece carried by said lever and normally engaging with the shoulder on said plunger and thereby preventing it from being moved by its spring, a space key, and mechanism operated thereby for engaging with said trigger piece to withdraw it from said shoulder, and a constantly rotating screw with which said plunger engages when released.

26. The combination of means for introducing temporary spacers into the line, a train of mechanism for operating said means, which train of mechanism includes a member which normally occupies an inert position, means holding said member in an inoperative position, a space key, a vertically movable bar operated thereby, a lever secured to the upper end of said bar mechanism adapted to be engaged by said lever for causing the release of said member, the vertically movable controller rod 90, and an arm carried thereby for engaging said lever to move it to an inactive position.

27. The combination of means for moving temporary spacers onto the assembling rail, a train of operating mechanism for actuating said device, a pivoted lever for breaking the operative connection between necessary parts of that train of mechanism, a spring plunger carried by said lever, a spring actuated trigger piece carried by said lever and normally engaging with the shoulder on said plunger and thereby preventing it from being moved by this spring, a space key, a vertically movable bar operated by said space key, a bell crank lever pivoted to the upper end of said bar and adapted to engage with and operate said trigger piece, a vertically movable controller rod whose position depends upon the number of temporary spacers which have been moved over the assembling rail, and an arm carried by said rod and arranged to engage with said bell crank lever to draw it into a position where it cannot engage with said trigger piece, after said controller rod has moved a predetermined distance.

28. The combination of mechanism controlling the delivery of matrices onto the assembling rail, a packer for engaging with the matrices, temporary spacers, mechanism for moving them singly into the assembling rail, a constantly rotating shaft, mechanism operated thereby for actuating the packer and for causing the timely operation of matrix controlling mechanism, and for operating the spacer introducing mechanism, a screw upon said shaft, means normally breaking the train of mechanism by which the spacers are moved over the assembling rail, a space key, and mechanism controlled thereby for causing said restraining means to engage with said screw and to be moved to a position which renders them inactive.

29. The combination of a detent slide, a block slidable thereon and a rod secured thereto and having a plurality of circumferential grooves, and a latch carried by said block and adapted to engage with any of said grooves.

30. The combination of a detent slide, a block slidable thereon, a latch carried by said block, a rod having a plurality of circumferential grooves with which said latch may be engaged, said rod having also a screw threaded portion which screws into a lug on said slide, and a bearing carried by said slide in which another part of said rod is rotatably mounted.

31. The combination of a detent slide, a block slidable thereon, a latch carried by said block, a rod having a plurality of circumferential grooves with which said latch may be engaged, said rod having also a screw threaded portion which screws into a lug on said slide, a bearing carried by said slide in which another part of said rod is rotatably mounted, a graduated knob secured to said rod, and a coöperating pointer fixed to said slide.

In testimony whereof, we hereunto affix our signatures in the presence of two witnesses.

BENJAMIN F. BELLOWS.
CONRAD LUTTROPP.

Witnesses:
   T. L. CLARK,
   W. L. FULLER.